United States Patent
Tisch et al.

(10) Patent No.: US 11,356,786 B2
(45) Date of Patent: Jun. 7, 2022

(54) METHOD AND APPARATUS FOR WIND NOISE DETECTION AND BEAM PATTERN PROCESSING

(71) Applicant: GoPro, Inc., San Mateo, CA (US)

(72) Inventors: Erich Tisch, San Francisco, CA (US); Eric Penrod, Brentwood, CA (US); Mark Hardin, Guerneville, CA (US); Timothy Dick, San Francisco, CA (US); Hakim Mesiwala, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/002,131

(22) Filed: Aug. 25, 2020

(65) Prior Publication Data

US 2021/0084422 A1   Mar. 18, 2021

Related U.S. Application Data

(60) Provisional application No. 62/900,936, filed on Sep. 16, 2019.

(51) Int. Cl.
*H04R 29/00* (2006.01)
*H04N 5/225* (2006.01)
*H04R 1/08* (2006.01)

(52) U.S. Cl.
CPC ......... *H04R 29/005* (2013.01); *H04N 5/2258* (2013.01); *H04R 1/08* (2013.01); *H04R 2410/07* (2013.01); *H04R 2499/11* (2013.01)

(58) Field of Classification Search
CPC ........ H04R 29/005; H04R 1/406; H04R 1/08; H04R 3/005; H04R 1/028; H04R 5/027; H04R 2499/11; H04R 2410/07; H04R 2430/03; H04R 2201/405; H04R 2201/401; H04R 2201/403; H04N 5/2258; H04N 5/23258; H04N 5/23254;
(Continued)

(56) References Cited

U.S. PATENT DOCUMENTS

2013/0308784 A1* 11/2013 Dickins ................ G10K 11/002
381/56
2017/0303043 A1* 10/2017 Young ................... H04R 1/406
(Continued)

*Primary Examiner* — Yogeshkumar Patel
(74) *Attorney, Agent, or Firm* — Young Basile Hanlon & MacFarlane, P.C.

(57) ABSTRACT

An image capture device includes a sensor, a microphone array, and a processor. The microphone array may include a first microphone, a second microphone, a third microphone, or any combination thereof. The first microphone may be configured to face a first direction. The second microphone may be configured to face a second direction. The second direction may be diametrically opposed to the first direction. The third microphone may be configured to face a third direction. The third direction may be substantially perpendicular to the first direction, the second direction, or both. The processor may be configured to determine a microphone capture pattern and detect wind noise. The microphone capture pattern may be determined based on data obtained from the sensor. The sensor data may include image data, audio data, image capture device orientation data, location data, accelerometer data, or any combination thereof.

20 Claims, 13 Drawing Sheets

(58) Field of Classification Search
CPC .... G10K 2210/3018; G10K 2210/3025; H04S 3/008; H04S 2400/15; H04S 2420/11
See application file for complete search history.

(56) References Cited

U.S. PATENT DOCUMENTS

2019/0132517 A1* 5/2019 Tisch .................... G06T 7/20
2019/0208099 A1* 7/2019 Cotoros ............ H04N 5/22521

* cited by examiner

METHOD AND APPARATUS FOR WIND NOISE DETECTION AND BEAM PATTERN PROCESSING

CROSS-REFERENCE TO RELATED APPLICATION(S)

This application claims priority to and the benefit of U.S. Provisional Patent Application No. 62/900,936, filed Sep. 16, 2019, the entire disclosure of which is hereby incorporated by reference.

TECHNICAL FIELD

This disclosure relates to audio capture patterns for electronic devices.

BACKGROUND

Dual-lens cameras are used to simultaneously record from a first-person perspective using a forward-facing lens and of the user using a rear-facing lens. Images from the dual lenses may be stitched together to create a spherical image. Single-lens and dual-lens cameras typically have multiple microphones to record an audio stream. Wind detection performance typically suffers in dual-lens cameras due to the number of microphones and the camera geometry.

SUMMARY

Disclosed herein are implementations of microphone pattern selection and wind noise detection. An aspect includes an image capture device. The image capture device includes a first image sensor, a second image sensor, one or more microphone assemblies, and a processor. The first image sensor may be configured to face a first direction. The first image sensor may be configured to obtain first image data. The second image sensor may be configured to face a second direction. The second direction may be diametrically opposed to the first direction. The second image sensor may be configured to obtain second image data.

In one or more aspects, the image capture device includes a first microphone assembly. The first microphone assembly may be configured to face the first direction. The first microphone assembly may include a first microphone and a second microphone. In one or more aspects, the image capture device may include a second microphone assembly. The second microphone assembly may be configured to face the second direction. The second microphone assembly may include a third microphone. In one or more aspects, the image capture device may include a third microphone assembly. The third microphone assembly may be configured to face a third direction. The third direction may be substantially perpendicular to the first, the second direction, or both. The third microphone assembly may include a fourth microphone and a fifth microphone.

The processor may be configured to determine a microphone capture pattern. The determined microphone capture pattern may be based on the first image data, the second image data, or both. The processor may be configured to detect wind noise. The wind noise may be detected based on a coherence value between at least two microphones.

An aspect may include a method that includes obtaining first image data. The first image data may be obtained from a first image sensor. The first image sensor may be facing a first direction. The method may include obtaining second image data. The second image data may be obtained from a second image sensor. The second image sensor may be facing a second direction. The second direction may be diametrically opposed to the first direction. The method may include determining a microphone capture pattern. The microphone capture pattern may be determined based on the first image data, the second image data, or both. The method may include detecting wind noise. The wind noise may be detected based on a coherence value between at least two microphones.

An aspect may include an image capture device. The image capture device includes a sensor, a microphone array, and a processor. The microphone array may include a first microphone, a second microphone, a third microphone, or any combination thereof. The first microphone may be configured to face a first direction. The second microphone may be configured to face a second direction. The second direction may be diametrically opposed to the first direction. The third microphone may be configured to face a third direction. The third direction may be substantially perpendicular to the first direction, the second direction, or both. The processor may be configured to automatically determine a microphone capture pattern. The processor may be configured to automatically determine a microphone assembly for wind noise detection. The microphone capture pattern may be determined based on data obtained from the sensor. The microphone assembly for wind noise detection may be determined based on data obtained from the sensor. The sensor data may include image data, audio data, image capture device orientation data, location data, accelerometer data, or any combination thereof.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

In the implementations described herein, a wind detector may be formed using two or more microphones. In an example, the wind detector may be based on a coherence value between any two microphones. The two microphones may be used to determine the presence of wind. The two microphones may be switched in accordance with a user selected pick up pattern. The two microphones may be automatically switched based on a camera orientation or a sensor.

Figure 1A:
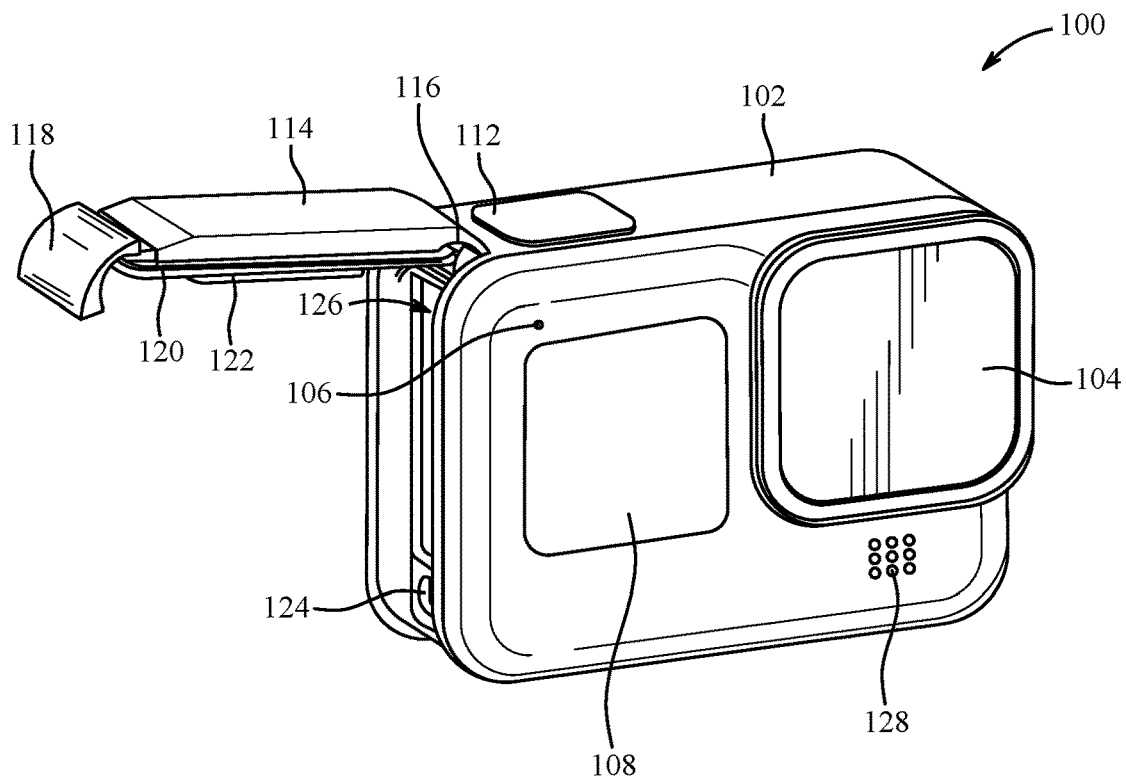
FIGS. 1A-B are isometric views of an example of an image capture device.
Figure 1B:
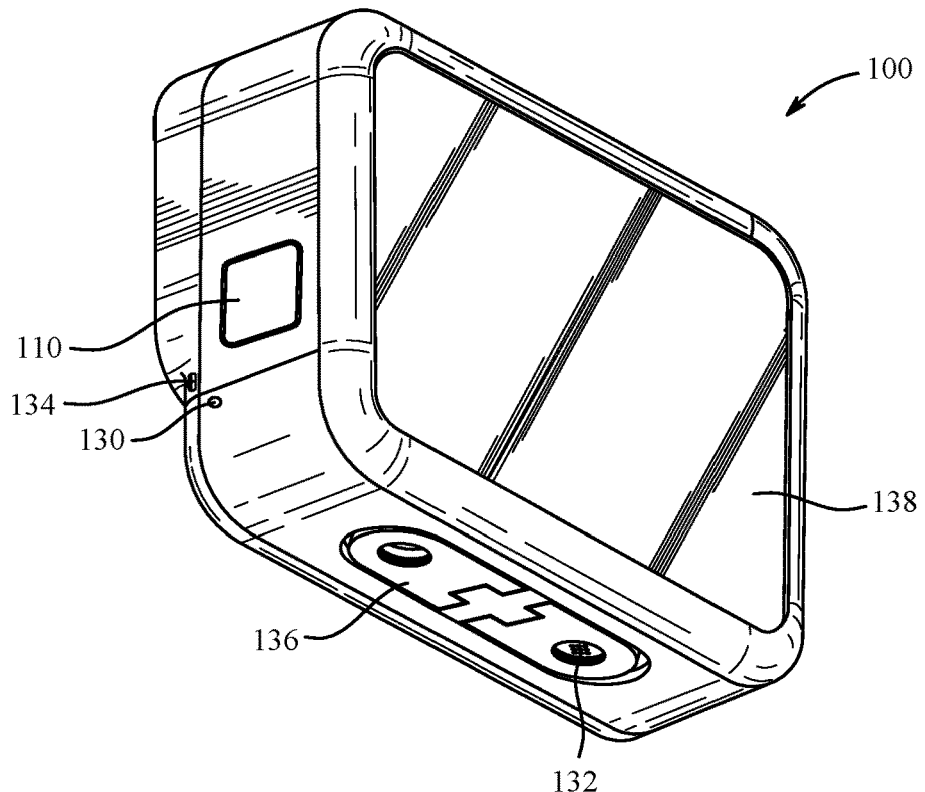

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 8A:
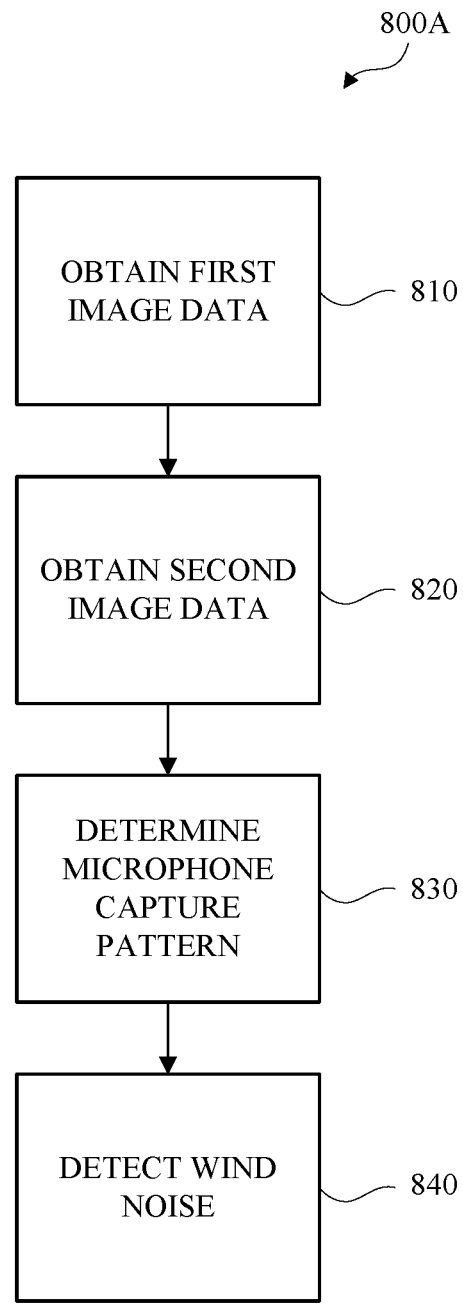
FIG. 8A is a flow diagram of an example of a method for determining a microphone pattern configuration and wind noise detection in accordance with embodiments of this disclosure.
Figure 8B:
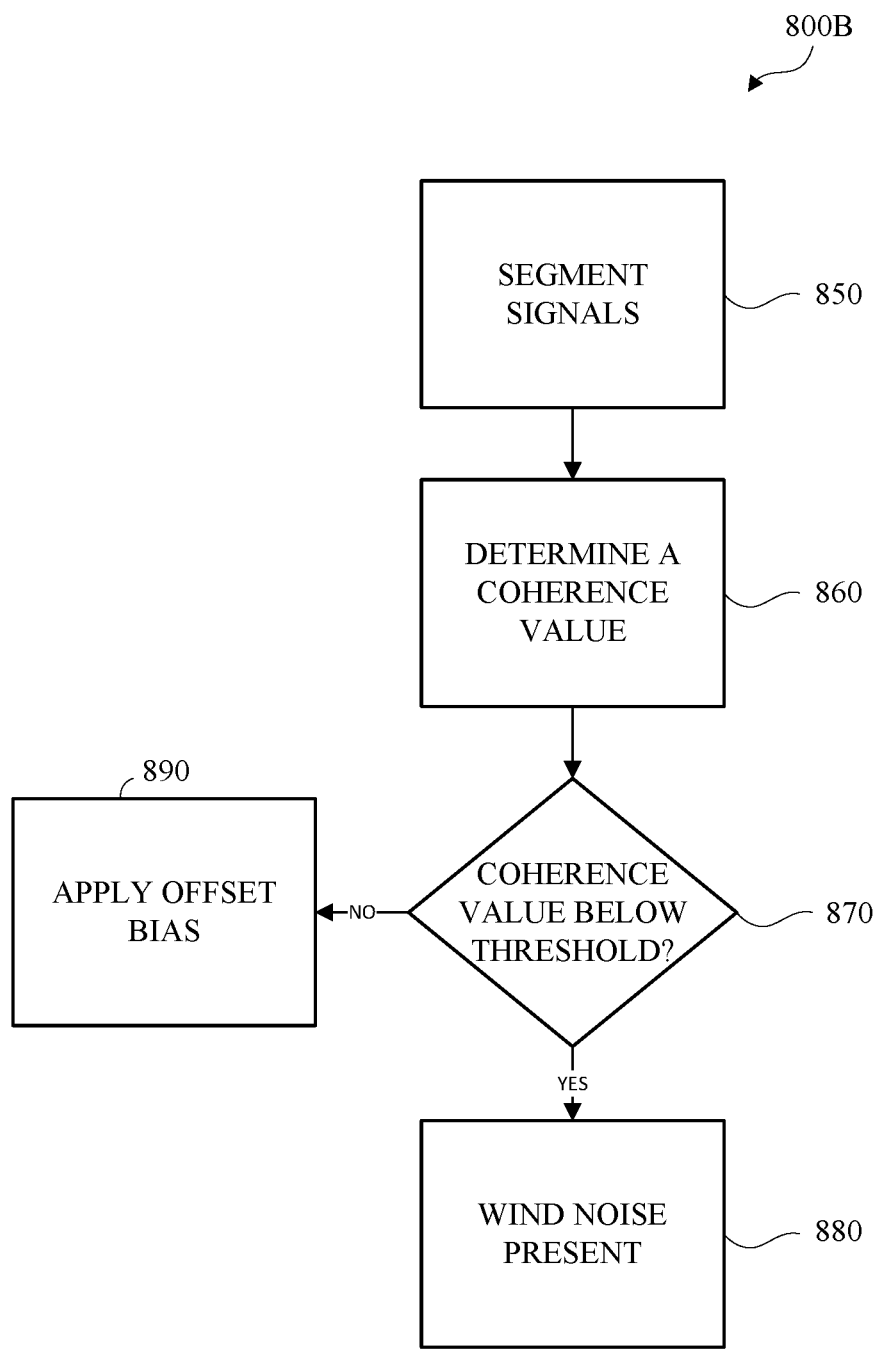
FIG. 8B is a flow diagram of an example method for detecting wind noise in accordance with embodiments of this disclosure.

The image capture device 100 may be used to implement some or all of the methods described in this disclosure, such as the methods 800A and 800B described in FIGS. 8A and 8B, respectively.

Figure 2A:
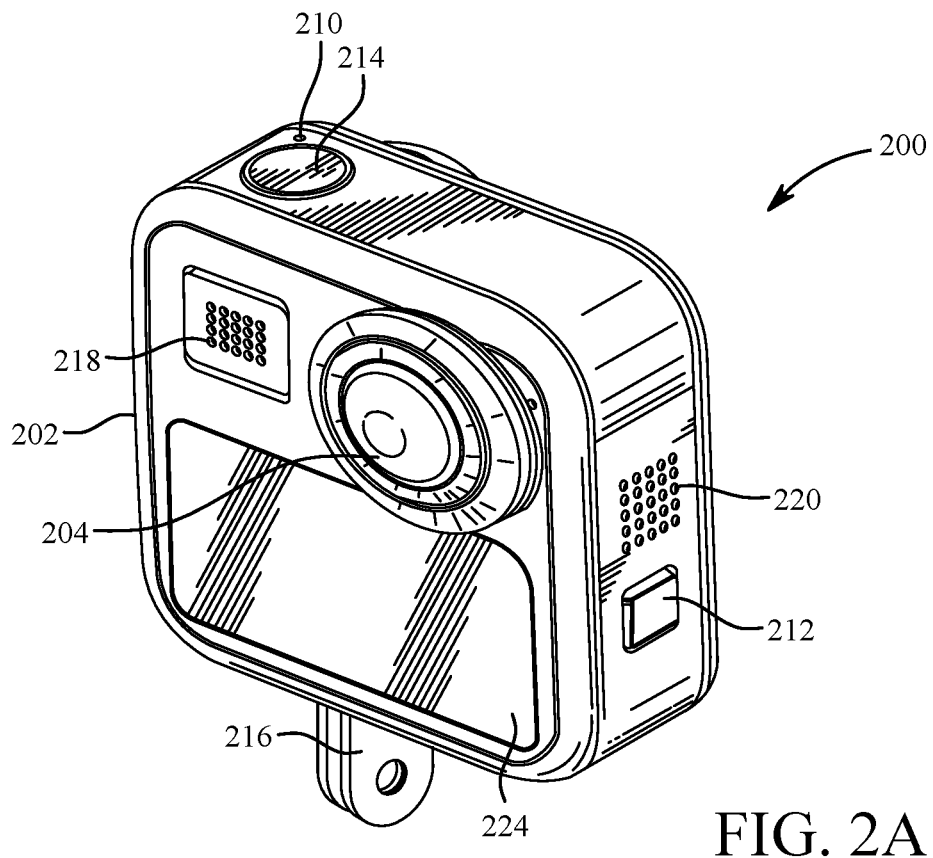
FIGS. 2A-B are isometric views of another example of an image capture device.
Figure 2B:
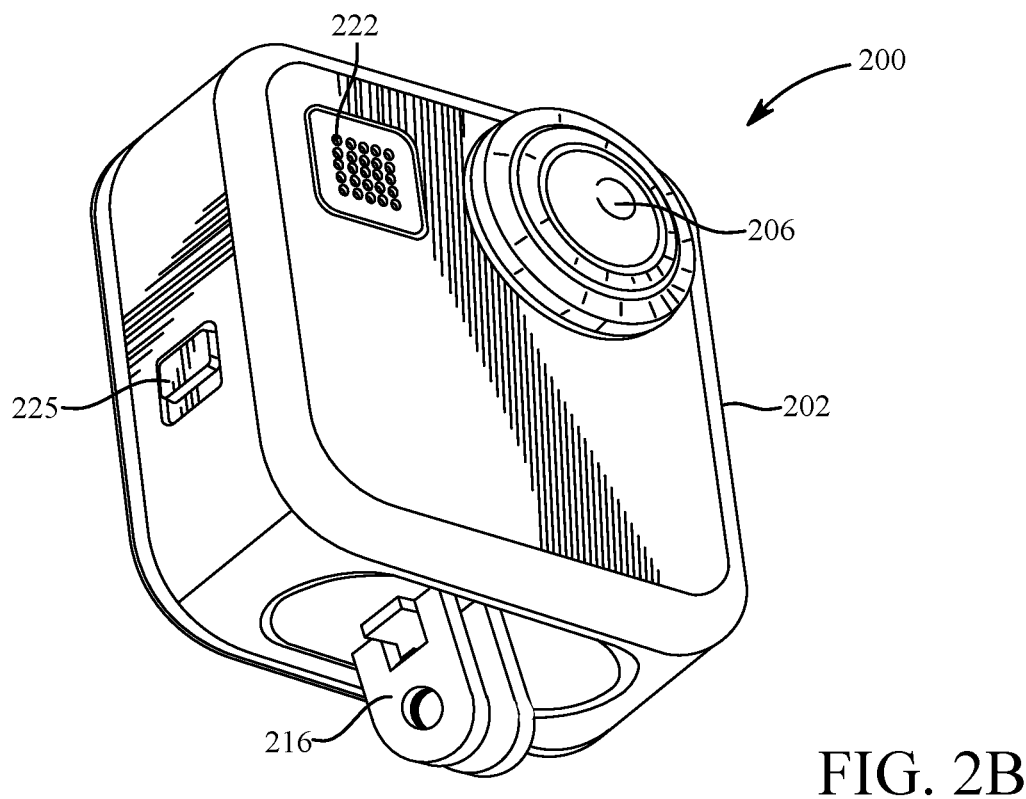

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
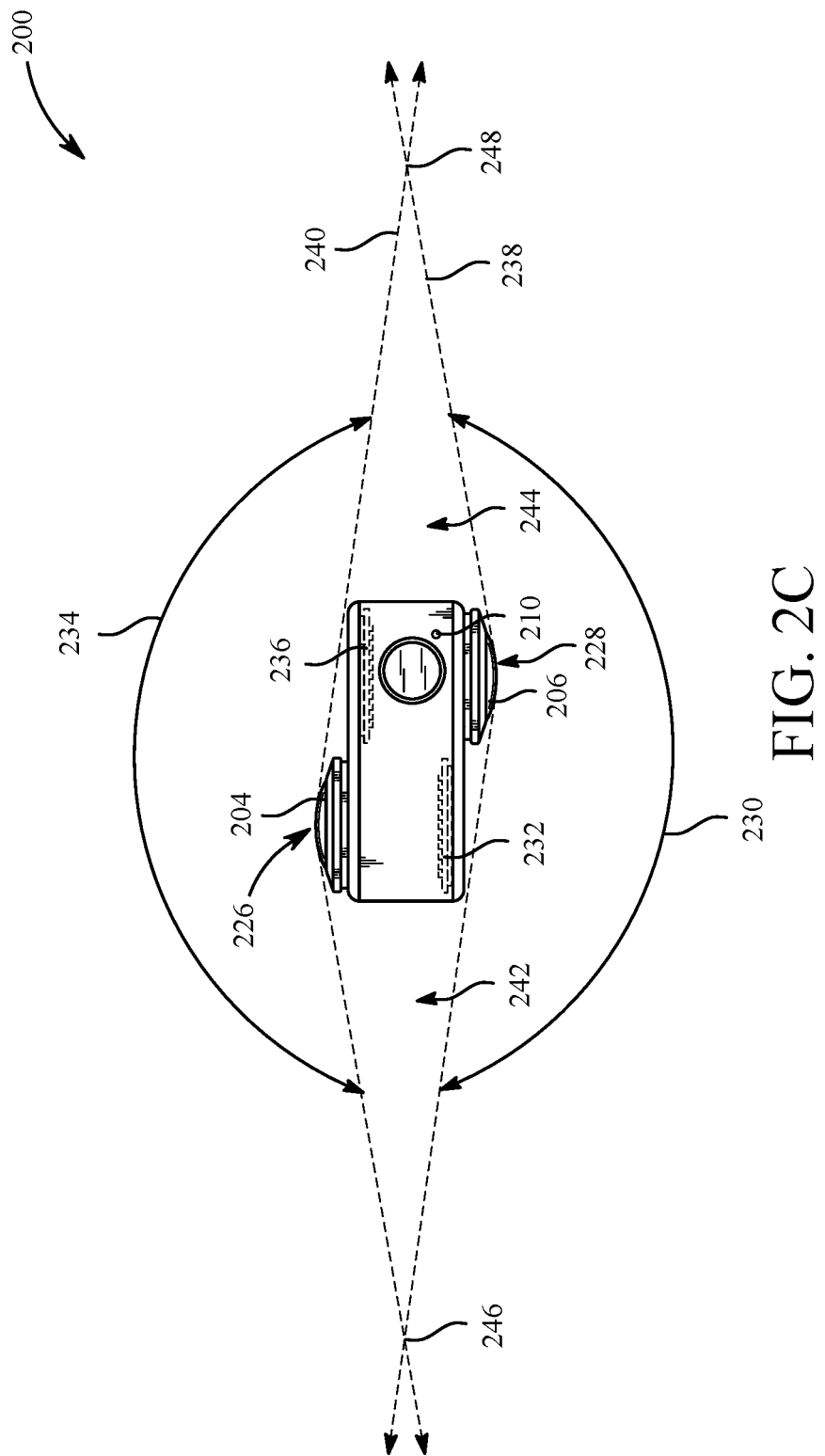
FIG. 2C is a top view of the image capture device of FIGS. 2A-B.
Figure 2D:
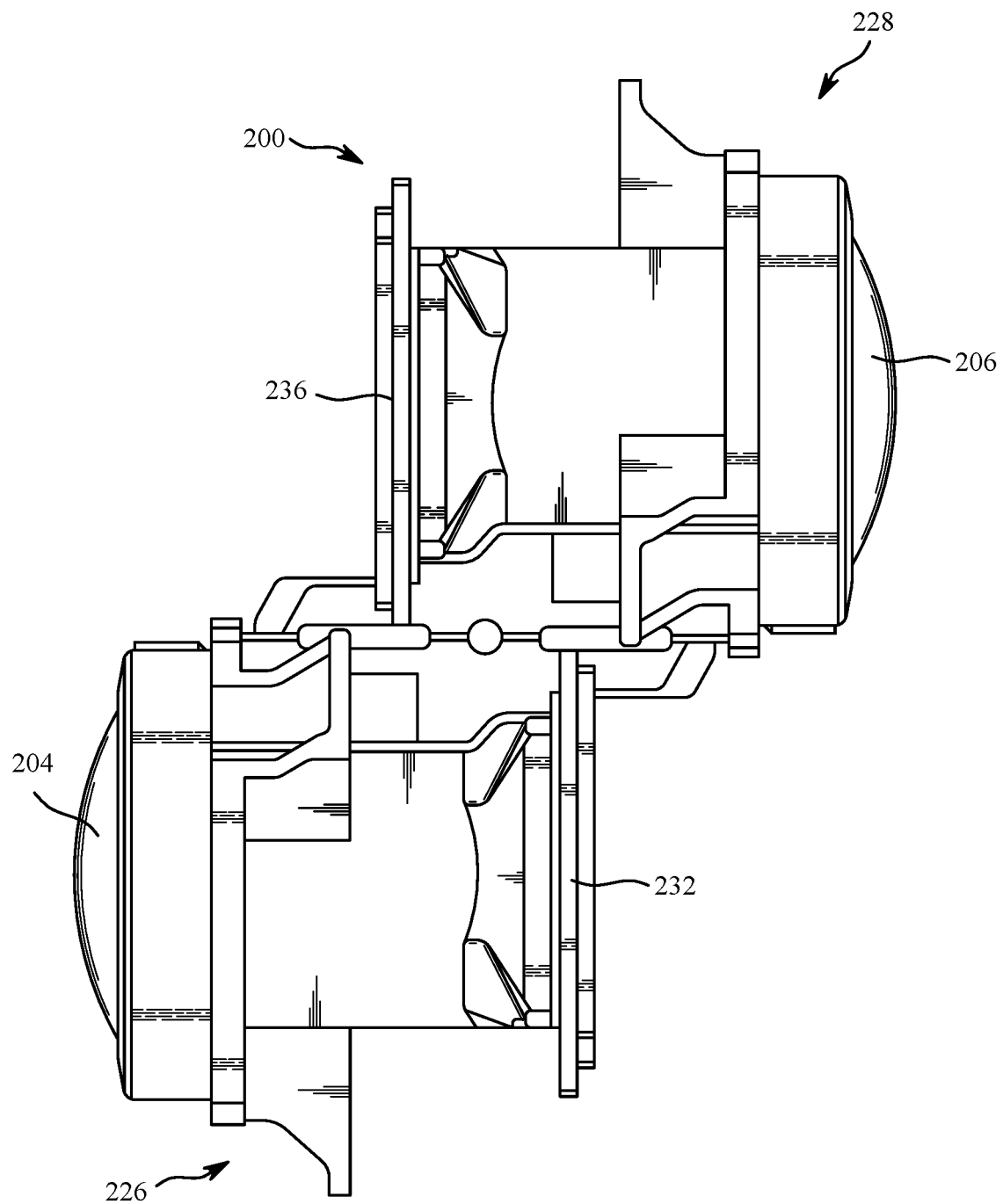
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the methods described in this disclosure, such as the methods 800A and 800B described in FIGS. 8A and 8B, respectively.

Figure 3:
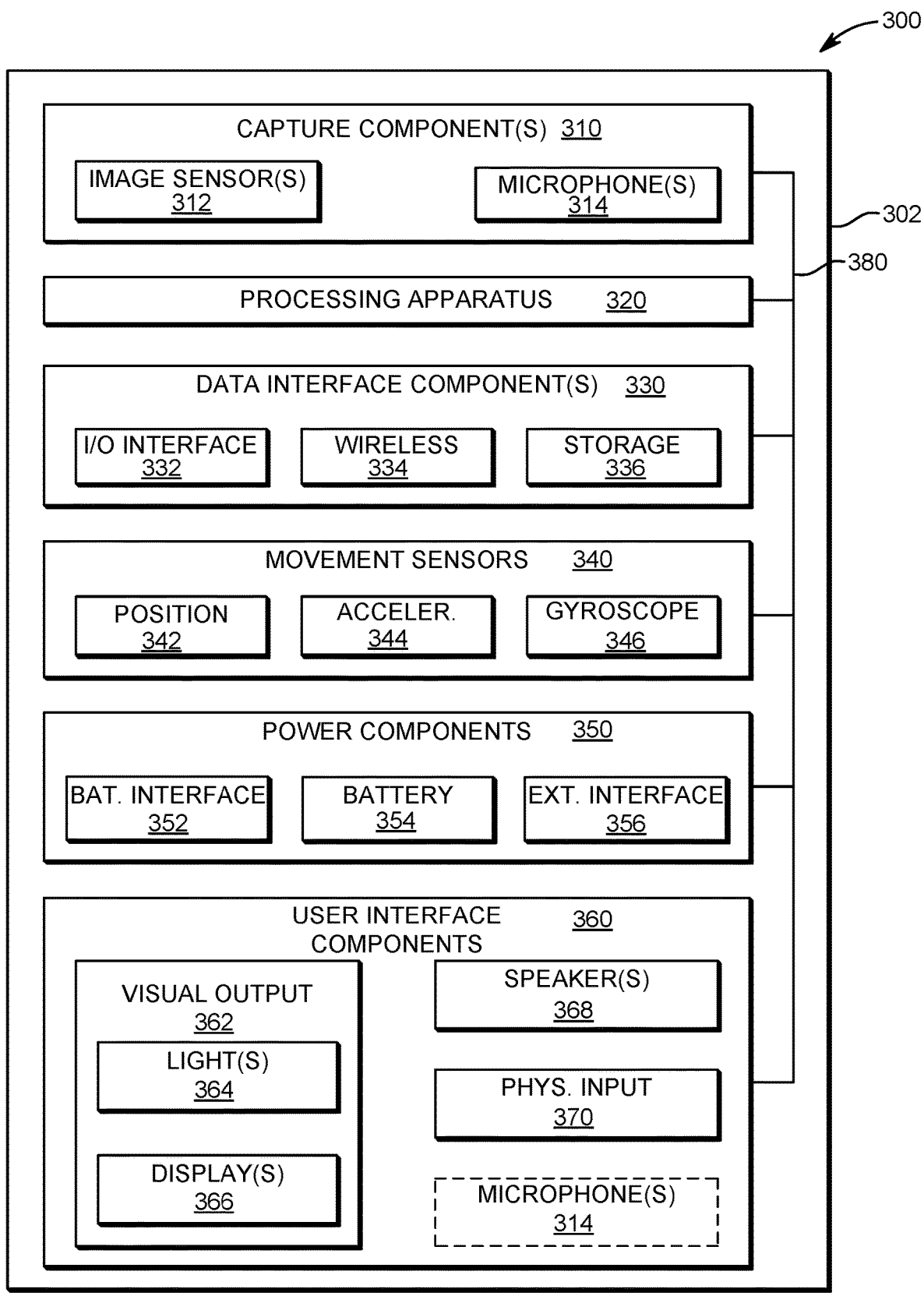
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the methods described in this disclosure, such as the methods 800A and 800B described in FIGS. 8A and 8B, respectively.

Figure 4A:
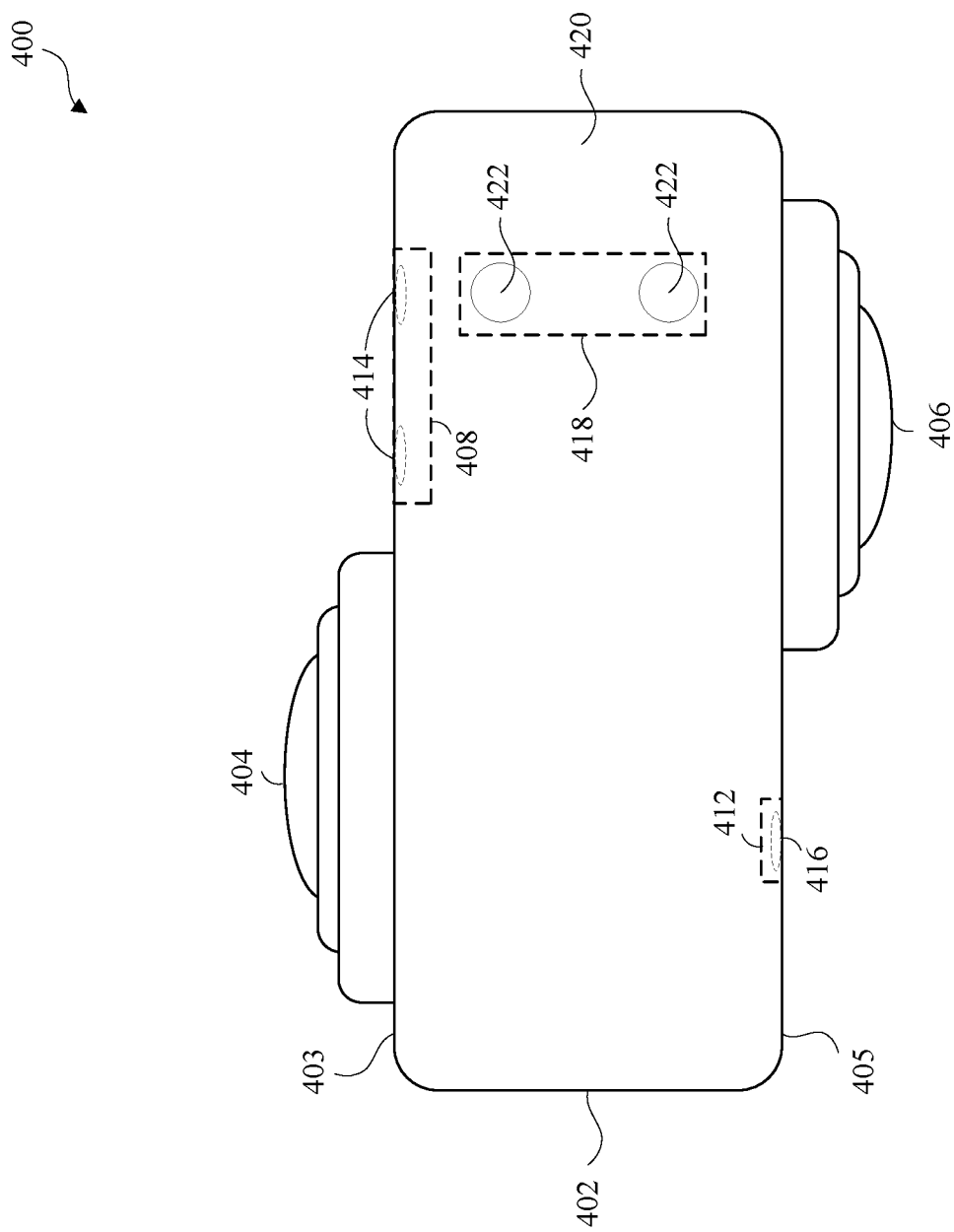
FIG. 4A is a diagram of a top-view of an image capture device in accordance with embodiments of this disclosure.

FIG. 4A is a diagram of a top-view of an image capture device 400 in accordance with embodiments of this disclosure. The image capture device 400 comprises a camera body 402 having two camera lenses 404, 406 structured on front and back surfaces 403, 405 of the camera body 402. The two lenses 404, 406 are oriented in opposite directions and couple with two images sensors mounted on circuit boards (not shown). Other electrical camera components (e.g., an image processor, camera SoC (system-on-chip), etc.) may also be included on one or more circuit boards within the camera body 402 of the image capture device 400.

The lenses 404, 406 may be laterally offset from each other, may be off-center from a central axis of the image capture device 400, or may be laterally offset and off-center from the central axis. As compared to an image capture device with back-to-back lenses, such as lenses aligned along the same axis, the image capture device 400 including laterally offset lenses 404, 406 may include substantially reduced thickness relative to the lengths of the lens barrels securing the lenses 404, 406. For example, the overall thickness of the image capture device 400 may be close to the length of a single lens barrel as opposed to twice the length of a single lens barrel as in a back-to-back configuration.

The image capture device 400 includes a microphone array that comprises a front-facing component 408, a rear-facing component 412, and a side-facing component 418. The front-facing component 408, the rear-facing component 412, and the side-facing component 418 may each be referred to as a microphone assembly. The side-facing component 418 may be on any side of the image capture device 400 that is perpendicular to the front-facing component 408 and the rear-facing component 412, and may include a top surface, a bottom surface, a left surface, a right surface, or any combination thereof. As shown in FIG. 4A, the front-facing component 408 is disposed on the front surface 403 of the image capture device. The front-facing component 408 may include one or more microphone elements 414. The microphone elements 414 may be configured such that they are distanced approximately 6 mm to 18 mm apart. The rear-facing component 412 is disposed on the back surface 405 of the image capture device 400. The rear-facing component 412 may include one or more microphone elements 416. One or more of the microphone elements 416 may be configured as a drain microphone. The side-facing component 418 is shown on a top surface 420 of the image capture device 400 in this example. The side-facing component 418 may include one or more microphone elements 422. The microphone elements 422 may be configured such that they are distanced approximately 6 mm to 18 mm apart. The 6 mm to 18 mm spacing may determine the frequency resolution of the output. For example, the larger the spacing, the lower the highest resolvable frequency. The spacing may be adjusted depending on the resolution required.

Figure 5:
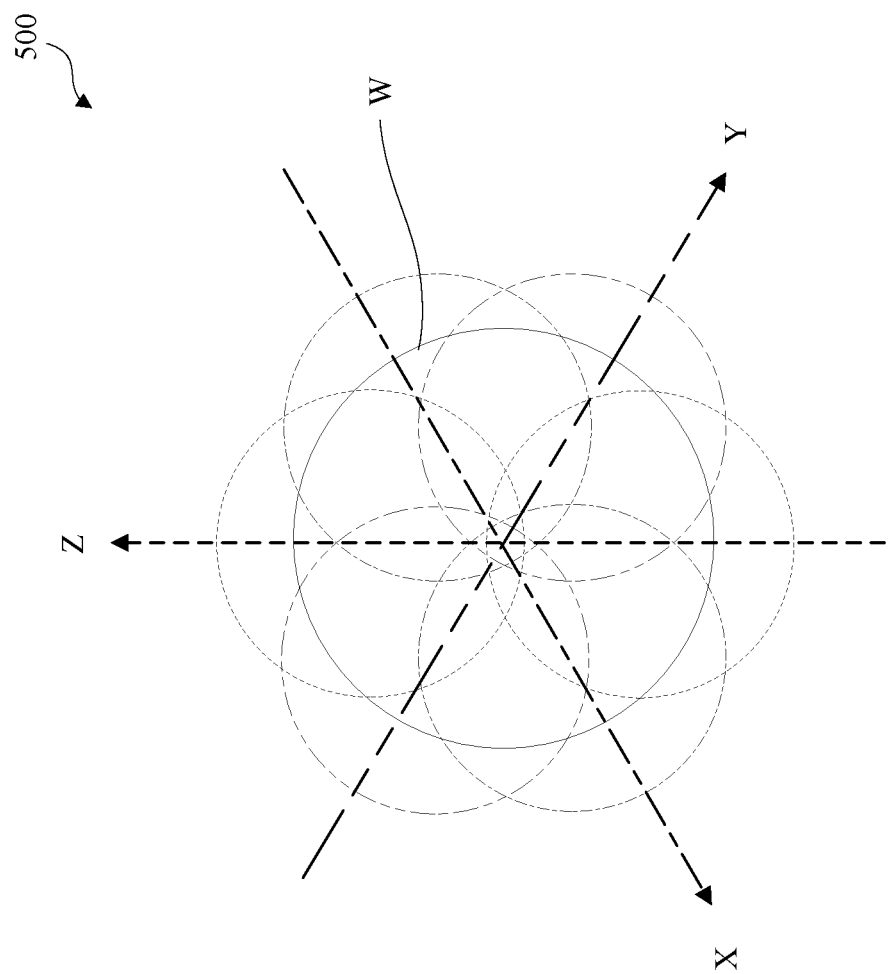
FIG. 5 is a diagram of a First Order Ambisonics B format sensitivity plot.

The front-facing component 408, microphone elements 414, rear-facing component 412, and microphone elements 416 are shown in broken lines as they may not be visible in this view. The front-facing component 408, rear-facing component 412, and side-facing component 418 of the microphone array may represent microphone elements on an X, Y, Z axis to create X, Y, Z components of a First Order Ambisonics B-Format, as shown in FIG. 5. These microphone elements may be oriented on a sphere or off-axis, and may be transformed to the First Order Ambisonics B-Format.

Figure 4B:
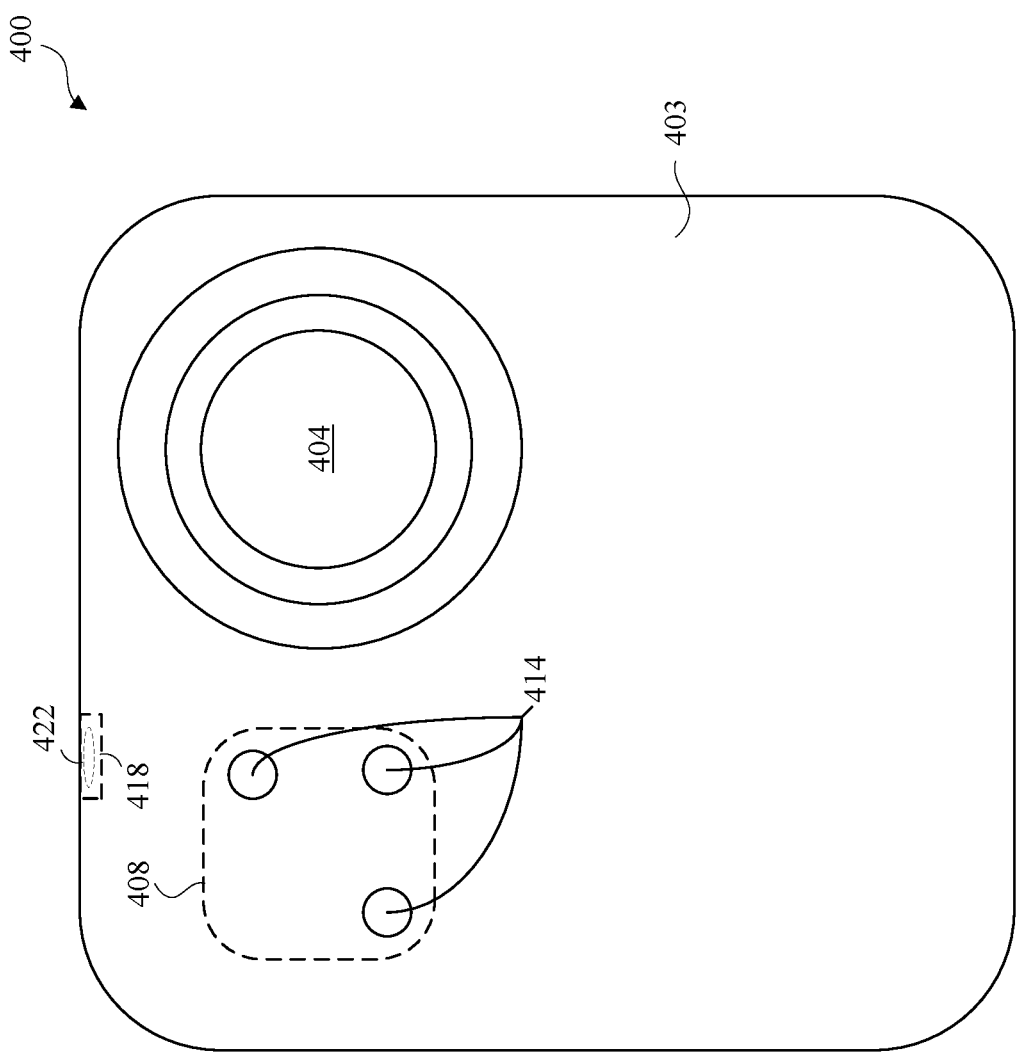
FIG. 4B is a diagram of a front-view of the image capture device shown in FIG. 4A in accordance with embodiments of this disclosure.

FIG. 4B is a diagram of a front-view of the image capture device 400 shown in FIG. 4A in accordance with embodiments of this disclosure. As shown in FIG. 4B, the front surface 403 of the image capture device 400 comprises the camera lens 404 and the front-facing component 408. Although the front-facing component 408 may include any number of microphone elements, the example shown in FIG. 4B includes three microphone elements 414. Each of the microphone elements 414 may be configured such that they are distanced approximately 6 mm to 18 mm apart. The side-facing component 418 and the microphone elements 422 are shown in broken lines as they may not be visible in this view.

Figure 4C:
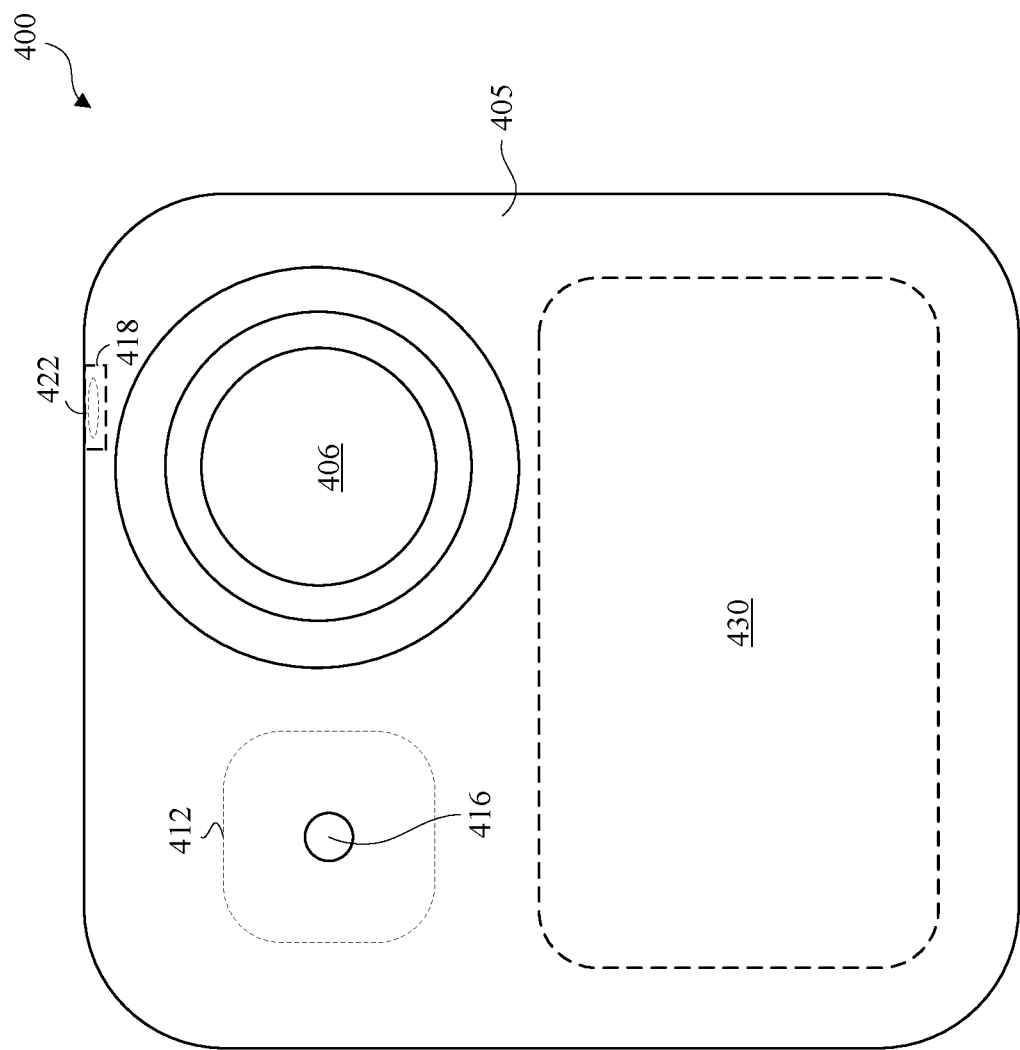
FIG. 4C is a diagram of a rear-view of the image capture device shown in FIG. 4A in accordance with embodiments of this disclosure.

FIG. 4C is a diagram of a rear-view of the image capture device 400 shown in FIG. 4A in accordance with embodiments of this disclosure. As shown in FIG. 4C, the back surface 405 of the image capture device 400 comprises the camera lens 406 and the rear-facing component 412. In an example, the back surface 405 of the image capture device 400 may include an interactive display 430 that allows for interaction with the image capture device 400 while simultaneously displaying information on a surface of the image capture device 400. Although the rear-facing component 412 may include any number of microphone elements, the example shown in FIG. 4C includes one microphone element 416. In an example, one or more of the microphone elements 416 may be configured as a drain microphone. The side-facing component 418 and the microphone elements 422 are shown in broken lines as they may not be visible in this view.

FIG. 5 is a diagram of a First Order Ambisonics B format sensitivity plot 500. The sensitivity plot 500 is an example of a pickup pattern of virtual microphones that are created through the processing of the signals from all or some of the omnidirectional microphone elements. In an example, the sensitivity plot 500 may be created from directional microphones. The front-facing component 408, rear-facing component 410, and side-facing component 412 of the microphone array of FIG. 4A may be used to capture omnidirectional signals and transform the omnidirectional signals into a first order Ambisonics B-format. The first order Ambisonics B-format may include four signals corresponding to three figure-8 signals X, Y, Z and one mono signal W, as shown in FIG. 5. Each signal X, Y, and Z may represent a respective axis in a three-dimensional sound field such as sound field 500.

The signals may be arranged into channels. For example, a W-channel may represent the omni sound pressure, an X-channel may represent a front-minus-back sound pressure gradient, a Y-channel may represent a left-minus-right sound pressure gradient, and a Z-channel may represent an up-minus-down sound pressure gradient. This four-channel format may represent the sensitivity plot 500.

Microphone elements such as microphone elements 414, microphone elements 416, and microphone elements 422 may be oriented in such a way that a pair of microphone elements reside on each X, Y, and Z axis. In an example, each pair of microphone elements may be used to create a figure-8 signal on each axis as shown in FIG. 5. The omni channel W may be created from a single microphone element or a sum of two or more microphone elements. In an example, a drain microphone may not be used for Ambisonics. For forming figure-8 signals X, Y, and Z, shown in FIG. 5, a selected set of bins, each of 100 Hz for example, different from the specially selected set for wind processing, may be processed differently than the remainder of the bins for reducing artifacts in creating the three figure-8 signals X, Y, and Z.

Figure 6:
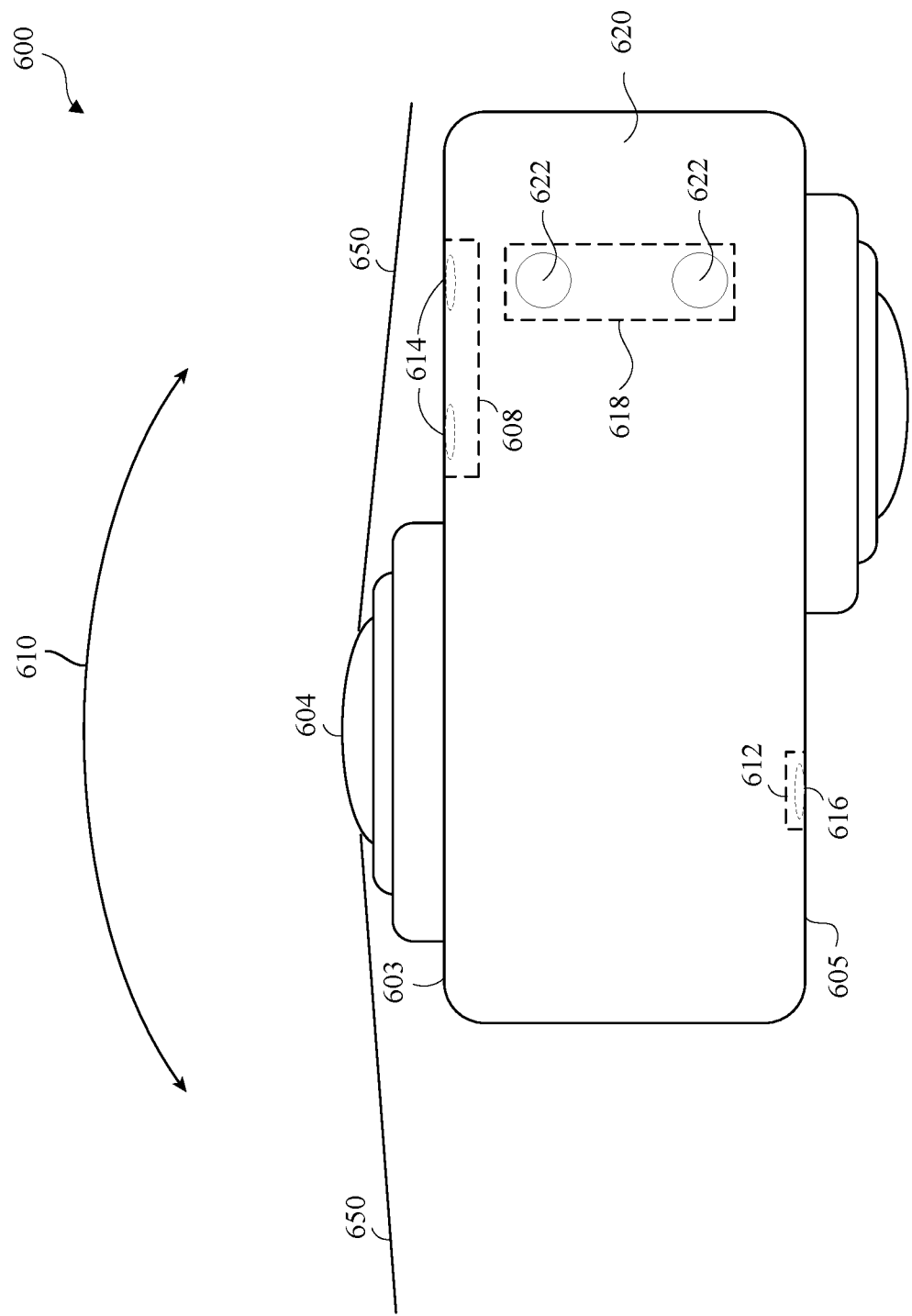
FIG. 6. is a diagram of a top-view of an example of an image capture device configured for audio capture and wind detection in accordance with embodiments of this disclosure.

FIG. 6 is a diagram of a top-view of an example of an image capture device 600 configured for audio capture and wind noise detection in accordance with embodiments of this disclosure. The microphone capture pattern may be based on sensor data, device orientation, or both. The sensor data may include, for example data obtained from an image sensor, a microphone, an inertial measurement unit (IMU), a GPS receiver component, a pressure sensor, a temperature sensor, a heart rate sensor, or any other sensor, or combination of sensors.

The image capture device 600 includes a front surface 603 that comprises a front-facing camera lens 604 and a front-facing component 608. Although the front-facing component 608 may include any number of microphone elements, the example shown in FIG. 6 includes two microphone elements 614. Each of the microphone elements 614 may be configured such that they are distanced approximately 6 mm to 18 mm apart. The front-facing component 608 and microphone elements 614 are shown in broken lines as they may not be visible in this view. The front-facing camera lens 604 of the image capture device 600 may have the field-of-view 610 shown above a boundary 650.

The image capture device 600 includes a microphone array that comprises the front-facing component 608, a rear-facing component 612, and a side-facing component 618. The front-facing component 608, the rear-facing component 612, and the side-facing component 618 may each be referred to as a microphone assembly. The side-facing component 618 may be on any side of the image capture device 600 that is perpendicular to the front-facing component 608 and the rear-facing component 612, and may include a top surface, a bottom surface, a left surface, a right surface, or any combination thereof. As shown in FIG. 6, the front-facing component 608 is disposed on the front surface 603 of the image capture device. The front-facing component 608 may include one or more microphone elements 614. The microphone elements 614 may be configured such that they are distanced approximately 6 mm to 18 mm apart. The rear-facing component 612 is disposed on the back surface 605 of the image capture device 600. The rear-facing component 612 may include one or more microphone elements 616. One or more of the microphone elements 616 may be configured as a drain microphone. The side-facing component 618 is shown on a top surface 620 of the image capture device 600 in this example. The side-facing component 618 may include one or more microphone elements 622. The microphone elements 622 may be configured such that they are distanced approximately 6 mm to 18 mm apart. The front-facing component 608, microphone elements 614, rear-facing component 612, and microphone elements 616 are shown in broken lines as they may not be visible in this view.

In this example, the image capture device 600 may perform an image capture using the front-facing camera lens 604 to capture the field-of-view 610 with various microphone patterns based on the user activity, user preference, image capture device orientation, or any combination thereof. In an example, the image capture device 600 may be configured to perform an image capture using the front-facing camera lens 604 and capture audio using the front-facing component 608. A processor, such as processing apparatus 312 of FIG. 3A, may be configured to determine a microphone capture pattern that captures mono or stereo audio using one or more of the microphone elements 614 during image capture via the front-facing camera lens 604. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors. For example, the processor may determine that the captured audio includes voice audio. In an example, if voice audio is detected, the processor may select a microphone capture pattern that captures audio from the rear-facing microphone or any microphone facing the direction from which the voice is originating. The microphone capture pattern may be a cardioid pattern that is configured to focus on the voice of the user. In an example, the microphones may not be facing the user in order to create a capture pattern that focuses on the user.

In this example, the processor may use two of the microphone elements 614 to detect wind noise. The processor may be configured to segment each signal from the microphone elements 614 into bins. Each bin may be a segment of any size, for example, each bin may be a 100 Hz segment of the microphone signal. The processor may be configured to detect wind noise based on a coherence value between two microphone elements, for example two of the microphone elements 614. The coherence value may be a measurement of correlation for every bin for signals between two microphone elements. The signals may be low level signals. A low level signal may refer to a signal with a low amplitude, a low power, a low signal-to-noise ratio (SNR), a low signal strength, or any combination thereof. The coherence value may range from 0.0 to 1.0, where a coherence value of 0.0 would indicate no correlation between two signals and a coherence value of 1.0 would indicate highly correlated signals.

The processor may determine that wind is detected when the coherence value between two microphone elements is below a threshold. The threshold may be any value, and may be based on image capture device geometry, image capture device orientation, microphone capture pattern, a device setting, user activity, user preference, or any combination thereof. For example, if the coherence value is below 0.8, the processor may determine that wind noise is present and transition from a microphone capture pattern to a wind processing mode. If the coherence value is above a threshold, the processor may be configured to determine that wind noise is not present and apply an offset bias to one or more signals such that non-correlated signals appear correlated. For example, if the coherence value is above 0.8, the processor may apply an offset bias to one or more signals such that the signals appear correlated. The offset bias may be applied to at least one microphone when transitioning from a wind processing mode to a microphone capture pattern.

In another example, the image capture device 600 may be configured to perform an image capture using the front-facing camera lens 604 and capture audio using the side-facing component 618. A processor, such as processing apparatus 312 of FIG. 3A, may be configured to determine a microphone capture pattern that captures audio using one or more of the microphone elements 622 during image capture via the front-facing camera lens 604. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors.

In this example, the processor may use two of the microphone elements 622 to detect wind noise. The processor may be configured to segment each signal from the microphone elements 622 into bins. Each bin may be a segment of any size, for example, each bin may be a 100 Hz segment of the microphone signal. The processor may be configured to detect wind noise based on a coherence value between two microphone elements, for example two of the microphone elements 622. The coherence value may be a measurement of correlation for every bin for signals between two microphone elements. The coherence value may range from 0.0 to 1.0, where a coherence value of 0.0 would indicate no correlation between two signals and a coherence value of 1.0 would indicate highly correlated signals.

The processor may determine that wind is detected when the coherence value between two microphone elements is below a threshold. The threshold may be any value, and may be based on image capture device geometry, image capture device orientation, microphone capture pattern, a device setting, user activity, user preference, or any combination thereof. For example, if the coherence value is below 0.8, the processor may determine that wind noise is present and transition from a microphone capture pattern to a wind processing mode. If the coherence value is above a threshold, the processor may be configured to determine that wind noise is not present and apply an offset bias to one or more signals such that non-correlated signals appear correlated. For example, if the coherence value is above 0.8, the processor may apply an offset bias to one or more signals such that the signals appear correlated. The offset bias may be applied to at least one microphone signal when transitioning from a wind processing mode to a microphone capture pattern.

Figure 7:
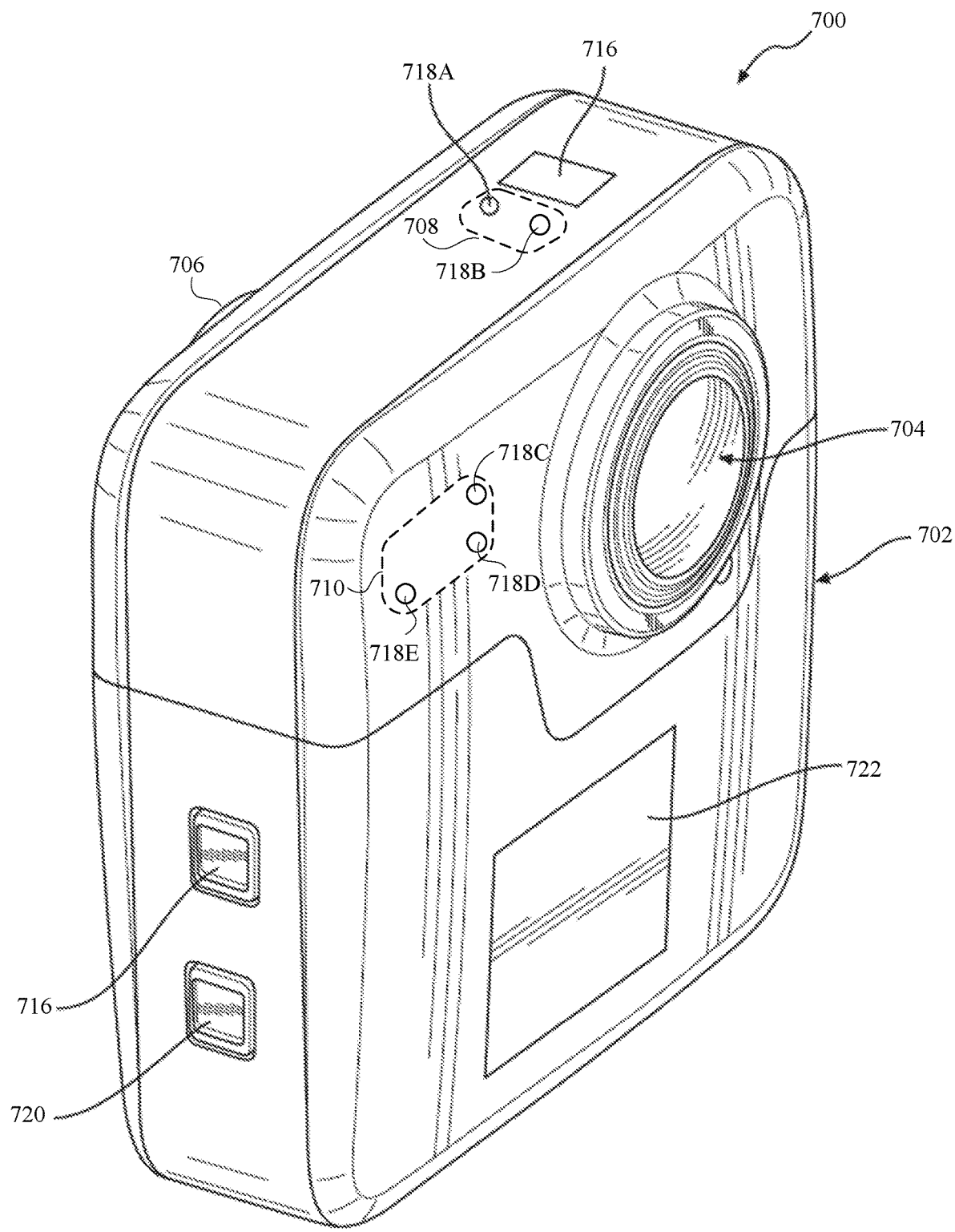
FIG. 7 is a diagram of an isometric view of another example of an image capture device configured for audio capture and wind noise detection in accordance with embodiments of this disclosure.

FIG. 7 is a diagram of an isometric view of an example of an image capture device 700 configured to determine a microphone capture pattern in accordance with embodiments of this disclosure. The microphone capture pattern may be based on sensor data. The sensor data may include, for example data obtained from an image sensor, a microphone, an IMU, a GPS receiver component, a pressure sensor, a temperature sensor, a heart rate sensor, or any other sensor, or combination of sensors.

The image capture device 700 includes a body 702 and two camera lenses 704, 706 disposed on opposing surfaces of the body 702, for example, in a back-to-back or Janus configuration.

The image capture device may include electronics (e.g., imaging electronics, power electronics, etc.) internal to the body 702 for capturing images via the lenses 704, 706 and/or performing other functions. The image capture device may include various indicators such as an LED light and an LCD display.

The image capture device 700 may include various input mechanisms such as buttons, switches, and touchscreen mechanisms. For example, the image capture device 700 may include buttons 716 configured to allow a user of the image capture device 700 to interact with the image capture device 700, to turn the image capture device 700 on, and to otherwise configure the operating mode of the image capture device 700. In an implementation, the image capture device 700 includes a shutter button and a mode button. It should be appreciated, however, that, in alternate embodiments, the image capture device 700 may include additional buttons to support and/or control additional functionality.

The image capture device 700 may also include one or more microphones. In this example, the image capture device 700 includes a side-facing component 708 and a front-facing component 710. The side-facing component 708 may be on any side of the image capture device 700 that is perpendicular to the front-facing component 708 and may include a top surface, a bottom surface, a left surface, a right surface, or any combination thereof. Although the side-facing component 708 may include any number of microphone elements, the example shown in FIG. 7 includes microphone element 718A and microphone element 718B. Although the front-facing component 710 may include any number of microphone elements, the example shown in FIG. 7 includes microphone element 718C, microphone element 718D, and microphone element 718E. Microphone elements 718A-718E are configured to receive and record audio signals (e.g., voice or other audio commands) in conjunction with recording video.

The image capture device 700 may include an I/O interface 720 and an interactive display 722 that allows for interaction with the image capture device 700 while simultaneously displaying information on a surface of the image capture device 700.

The image capture device 700 may be made of a rigid material such as plastic, aluminum, steel, or fiberglass. In some embodiments, the image capture device 700 described herein includes features other than those described. For example, instead of the I/O interface 720 and the interactive display 722, the image capture device 700 may include additional interfaces or different interface features. For example, the image capture device 700 may include additional buttons or different interface features, such as interchangeable lenses, cold shoes and hot shoes, and mounts that can add functional features to the image capture device 700.

In an example, the image capture device 700 may perform an image capture using the front-facing camera lens 704 with various microphone patterns based on the user activity, user preference, image capture device orientation, or any combination thereof. In this example, the image capture device 700 may be configured to perform an image capture using the front-facing camera lens 704 and capture audio using the front-facing component 708. A processor, such as processing apparatus 312 of FIG. 3A, may be configured to determine a microphone capture pattern that captures mono or stereo audio using one or more of the microphone elements, for example microphone element 718D and microphone element 718E, during image capture via the front-facing camera lens 704. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors. For example, the processor may determine that the captured audio includes voice audio. In an example, if voice audio is detected, the processor may select a microphone capture pattern that captures audio from any microphone facing the direction from which the voice is originating. The microphone capture pattern may be a cardioid pattern that is configured to focus on the voice of the user. In an example, the microphones may not be facing the user in order to create a capture pattern that focuses on the user.

In this example, the processor may use two of the microphone elements detect wind noise. For example, the processor may use microphone element 718A and microphone element 718B to detect wind noise. The processor may be configured to segment each signal from the microphone elements 718A and 718B into bins. Each bin may be a segment of any size, for example, each bin may be a 100 Hz segment of the microphone signal. The processor may be configured to detect wind noise based on a coherence value between two microphone elements, for example the microphone elements 718A and 718B. The coherence value may be a measurement of correlation for every bin for signals between two microphone elements. The coherence value may range from 0.0 to 1.0, where a coherence value of 0.0 would indicate no correlation between two signals and a coherence value of 1.0 would indicate highly correlated signals.

The processor may determine that wind is detected when the coherence value between two microphone elements is below a threshold. The threshold may be any value, and may be based on image capture device geometry, image capture device orientation, microphone capture pattern, a device setting, user activity, user preference, or any combination thereof. For example, if the coherence value is below 0.8, the processor may determine that wind noise is present and transition from a microphone capture pattern to a wind processing mode. If the coherence value is above a threshold, the processor may be configured to determine that wind noise is not present and apply an offset bias to one or more signals such that non-correlated signals appear correlated. For example, if the coherence value is above 0.8, the processor may apply an offset bias to one or more signals such that the signals appear correlated. The offset bias may be applied to at least one microphone signal when transitioning from a wind processing mode to a microphone capture pattern.

In another example, the image capture device 700 may be configured to perform an image capture using the front-facing camera lens 704 and capture audio using the side-facing component 708. A processor, such as processing apparatus 312 of FIG. 3A, may be configured to determine a microphone capture pattern that captures audio using one or more of the microphone elements 718A and 718B during image capture via the front-facing camera lens 704. The microphone capture pattern may be based on sensor data, user preference, or both. The sensor data may include, for example data obtained from an image sensor, a microphone, an IMU, a GPS receiver component, a pressure sensor, a temperature sensor, a heart rate sensor, or any other sensor, or combination of sensors. For example, the IMU data may indicate that the image capture device 700 is lying on its side or back, and the microphone capture patterns may be adjusted accordingly taking into account the orientation of the image capture device 700 to enhance audio quality.

In this example, the processor may use two of the microphone elements to detect wind noise. For example, the processor may use microphone element 718D and microphone element 718E to detect wind noise. The processor may be configured to segment each signal from the microphone elements 718A and 718B into bins. Each bin may be a segment of any size, for example, each bin may be a 100 Hz segment of the microphone signal. The processor may be configured to detect wind noise based on a coherence value between two microphone elements, for example the microphone elements 718A and 718B. The coherence value may be a measurement of correlation for every bin for signals between two microphone elements. The coherence value may range from 0.0 to 1.0, where a coherence value of 0.0 would indicate no correlation between two signals and a coherence value of 1.0 would indicate highly correlated signals.

The processor may determine that wind is detected when the coherence value between two microphone elements is below a threshold. The threshold may be any value, and may be based on image capture device geometry, image capture device orientation, microphone capture pattern, a device setting, user activity, user preference, or any combination thereof. For example, if the coherence value is below 0.8, the processor may determine that wind noise is present and transition from a microphone capture pattern to a wind processing mode. If the coherence value is above a threshold, the processor may be configured to determine that wind noise is not present and apply an offset bias to one or more signals such that non-correlated signals appear correlated. For example, if the coherence value is above 0.8, the processor may apply an offset bias to one or more signals such that the signals appear correlated. The offset bias may be applied to at least one microphone signal when transitioning from a wind processing mode to a microphone capture pattern.

Although the image capture examples of FIG. 6 and FIG. 7 are described separately, the actions described herein may be performed simultaneously in the same device in conjunction with the various microphone capture patterns. For example, an image capture may be performed simultaneously using both camera lenses, and audio may be captured using all available microphone elements. Microphone elements used for wind detection may be automatically switched based on device orientation, user activity, or device setting. In an example, the microphone capture patterns may be selected in post-image capture editing.

FIG. 8A is a flow diagram of a method 800A for determining a microphone pattern configuration and wind noise detection. The method 800A includes obtaining first image data 810, obtaining second image data 820, determining a microphone capture pattern 830, and detecting wind noise 840. The first image data may be obtained from a first image sensor facing a first direction. The second image data may be obtained from a second image sensor facing a second direction. In an example, the second direction may be diametrically opposed to the first direction. Determining a microphone capture pattern 830 may be based on the first image data, the second image data, a user input, or a combination thereof. For example, if the image data indicates a detection of an activity of interest, the microphone capture pattern may be determined such that it captures audio in the direction of the detected activity of interest. The activity of interest may be any activity such as, but not limited to, walking, biking, surfing, skiing, vlogging, or the like. For example, the first image data may indicate a detection of a person mountain biking, and the microphone pattern may be determined such that it captures audio from the direction of the first image sensor facing the person mountain biking. The method 800A may include detecting voice audio. In an example, if voice audio is detected, the method 800A may include selecting a microphone capture pattern that captures audio from the rear-facing microphone or any microphone facing the direction from which the voice is originating. In an example, the microphones may not be facing the user in order to create a capture pattern that focuses on the user.

The determined microphone capture pattern may be created using a first microphone facing the first direction, a second microphone facing the second direction, or a third microphone facing a third direction. In an example, the third direction may be substantially perpendicular to the first and second directions.

The image capture may be performed using a front-facing camera lens while simultaneously capturing the sound field of the first microphone, the sound field of the second microphone, the sound field of the third microphone, or any combination thereof. The image capture may be performed using a rear-facing camera lens while simultaneously capturing the sound field of the first microphone, the sound field of the second microphone, the sound field of the third microphone, or any combination thereof.

The determined microphone capture pattern may be created using the first microphone and the second microphone. The determined microphone capture pattern may be created using the first microphone and the third microphone. The determined microphone capture pattern may be created using the second microphone and the third microphone. The determined microphone capture pattern may be created using the first microphone, the second microphone, and the third microphone.

Detecting wind noise 840 may be based on a coherence value between at least two microphones. FIG. 8B is a flow diagram of an example method 800B for detecting wind noise. Referring to FIG. 8B, method 800B for detecting wind noise may include segmenting 850 each signal from the at least two microphone elements into bins. Each bin may be a segment of any size, for example, each bin may be a 100 Hz segment of the microphone signal. The method 800B may include determining 860 a coherence value between any two microphone elements, for example the microphone elements 718A and 718B of FIG. 7. The coherence value may be determined for each bin of the microphone signals of the two microphone elements. The coherence value may be a measurement of correlation for every bin for signals between two microphone elements. The coherence value may range from 0.0 to 1.0, where a coherence value of 0.0 would indicate no correlation between two signals and a coherence value of 1.0 would indicate highly correlated signals.

The method 800B may include determining 870 that wind noise is present 880 when the coherence value between two microphone elements is below a threshold. The threshold may be any value, and may be based on image capture device geometry, image capture device orientation, microphone capture pattern, a device setting, user activity, user preference, or any combination thereof. For example, if the coherence value is below 0.8, the processor may determine 870 that wind noise is present 880 and transition from a microphone capture pattern to a wind processing mode. If the coherence value is above a threshold, the processor may be configured to determine that wind noise is not present and apply an offset bias 890 to the coherence calculation such that non-correlated signals appear correlated. For example, if the coherence value is above 0.8, the processor may apply an offset bias 890 to the coherence calculation such that the signals appear correlated. The offset bias may be applied when transitioning from a wind processing mode to a microphone capture pattern. In wind processing, shown in FIG. 8B, a selected set of bins, each of 100 Hz for example, may be processed differently than the remainder of the bins for creating more effective wind processing.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
a first image sensor facing a first direction, the first image sensor configured to obtain first image data;
a second image sensor facing a second direction, the second direction being diametrically opposed to the first direction, the second image sensor configured to obtain second image data;
a first microphone assembly facing the first direction, wherein the first microphone assembly comprises a first microphone and a second microphone;
a second microphone assembly facing the second direction, wherein the second microphone assembly comprises a third microphone;
a third microphone assembly facing a third direction that is perpendicular to the first and second directions, wherein the third microphone assembly comprises a fourth microphone and a fifth microphone; and
a processor configured to:
determine an activity based on at least one of the first image data or the second image data;
determine a microphone capture pattern using at least two microphones based on the activity; and
detect wind noise based on a coherence value between the at least two microphones.

2. The image capture device of claim 1, wherein the microphone capture pattern is created using the first microphone assembly, the second microphone assembly, or the third microphone assembly.

3. The image capture device of claim 1, wherein the microphone capture pattern is created using the first microphone and the second microphone, and the at least two microphones comprise the first microphone and the second microphone.

4. The image capture device of claim 1, wherein the microphone capture pattern is created using the first microphone and the second microphone, and the at least two microphones comprise the fourth microphone and the fifth microphone.

5. The image capture device of claim 1, wherein the microphone capture pattern is created using the third microphone, and the at least two microphones comprise the fourth microphone and the fifth microphone.

6. The image capture device of claim 1, wherein the microphone capture pattern is created using the fourth microphone and the fifth microphone, and the at least two microphones comprise the first microphone and the second microphone.

7. The image capture device of claim 1, wherein the microphone capture pattern is created using the fourth microphone and the fifth microphone, and the at least two microphones comprise the fourth microphone and the fifth microphone.

8. The image capture device of claim 1, wherein the processor is further configured to segment a signal from each of the at least two microphones into bins to detect wind noise.

9. The image capture device of claim 1, wherein the processor is further configured to determine whether the coherence value is below a threshold.

10. The image capture device of claim 9, wherein on a condition that the coherence value is below the threshold, the processor is further configured to determine that wind noise is present.

11. The image capture device of claim 9, wherein on a condition that the coherence value is above the threshold, the processor is further configured to determine that wind noise is not present.

12. A method comprising:
  obtaining first image data from a first image sensor facing a first direction;
  obtaining second image data from a second image sensor facing a second direction, the second direction being diametrically opposed to the first direction;
  determining an activity based on at least one of the first image data or the second image data;
  determining a microphone capture pattern using at least two microphones based on the activity; and
  detecting wind noise based on a coherence value between the at least two microphones.

13. The method of claim 12, wherein detecting wind noise comprises:
  segmenting a signal from each of the at least two microphones into bins;
  determining, for each bin, the coherence value between the at least two microphones; and
  determining whether the coherence value is below a threshold.

14. The method of claim 13 further comprising:
  determining that wind noise is present on a condition that the coherence value is below a threshold; and
  transitioning the microphone capture pattern to a wind processing mode.

15. The method of claim 13, wherein a first set of bins may be processed differently than a second set of bins, wherein the first set of bins is for wind processing.

16. The method of claim 12, wherein the coherence value is a measurement of correlation for each bin of a signal between two microphones.

17. An image capture device comprising:
  a sensor;
  a first microphone assembly facing a first direction;
  a second microphone assembly facing a second direction, the second direction being diametrically opposed to the first direction;
  a third microphone assembly facing a third direction that is perpendicular to the first and second directions; and
  a processor configured to:
  determine an activity based on image data; and
  determine a microphone capture pattern and a microphone assembly for wind noise detection based on the activity and data obtained from the sensor.

18. The image capture device of claim 17, wherein the sensor is an inertial measurement unit (IMU).

19. The image capture device of claim 17, wherein the microphone capture pattern is associated with a sound field of the first microphone assembly, and the microphone assembly for wind noise detection is the third microphone assembly.

20. The image capture device of claim 17, wherein the microphone capture pattern is associated with a sound field of the first microphone assembly, and the microphone assembly for wind noise detection is the first microphone assembly.

* * * * *